Oct. 12, 1937.  S. A. MOSS  2,095,263
BUTTERFLY VALVE
Filed April 25, 1936
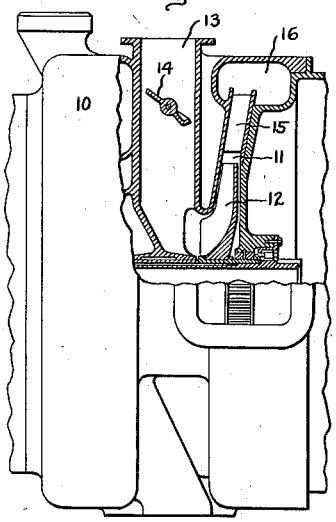
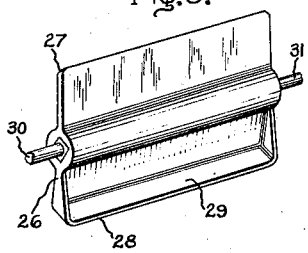
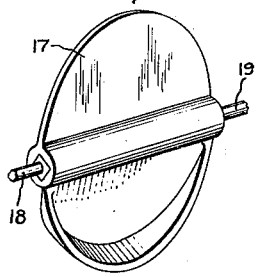
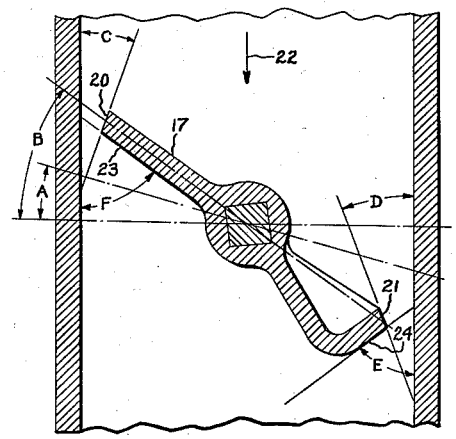
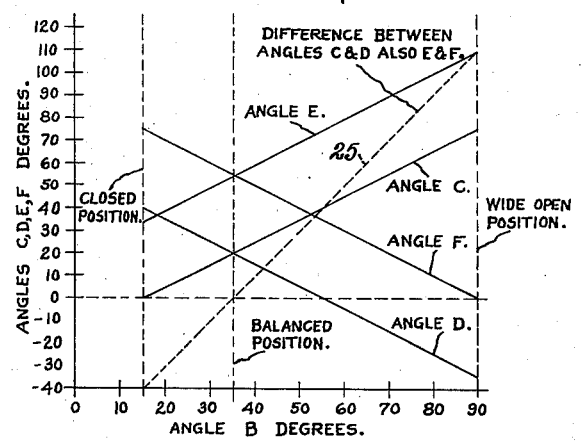
Inventor:
Sanford A. Moss,
by Harry E. Dunham
His Attorney.

Patented Oct. 12, 1937

2,095,263

UNITED STATES PATENT OFFICE 2,095,263

BUTTERFLY VALVE

Sanford A. Moss, Lynn, Mass., assignor to General Electric Company, a corporation of New York Application April 25, 1936, Serial No. 76,436

6 Claims. (Cl. 251—11)

The present invention relates to butterfly valves used for controlling the flow of fluid through conduits, such as in the case of superchargers for supercharging internal combustion engines where such butterfly valves are often provided in the inlet of the superchargers to control the flow of air to the inlet of impellers. These butterfly valves are usually in the form of flat disks pivotally supported on central portions. When slightly opened during operation these kinds of valves have the tendency to close. This tendency is due to the fact that these valves are unbalanced in intermediate positions, that is, in any position intermediate the full closing and full opening position. The forces exerted on the valve portions opposite the axis of support do not balance or compensate each other, the unbalance thus created tending to close the valve when near closing position.

The object of my invention is to provide an improved construction and arrangement of butterfly valves whereby these valves are substantially balanced in intermediate positions and completely balanced in at least one position near the closing position.

For a consideration of what I believe to be novel and my invention, attention is directed to the following description and the claims appended thereto in connection with the accompanying drawing.

In the drawing Fig. 1 represents a supercharger with a butterfly valve embodying my invention; Fig. 2 is an enlarged view of a portion of Fig. 1; Fig. 3 is an explanatory diagram of the operation of certain characteristics of the butterfly valves of Figs. 1 and 2; Fig. 4 is a perspective view of the butterfly valve; and Fig. 5 is a perspective view of a modification of a valve for use in a conduit with rectangular cross section.

The arrangement shown in Fig. 1 comprises a casing 10 forming an impeller chamber 11 for accommodating an impeller 12. Fluid, in the present instance air, is conducted to the inlet of the impeller chamber through a conduit 13 communicating with the atmosphere. The flow of fluid through the conduit 13 is controlled by a butterfly valve 14 embodying my invention. Fluid discharged by the impeller 12 is conducted through a diffuser 15 into a scroll or collector 16, whence it flows to a consumer, not shown.

The valve as shown in Fig. 2 comprises a disk or plate 17 which has diametrically opposite points pivotally supported on the walls of the conduit by stubs 18 and 19 secured to the plate. The valve is shown in a position near the closing position. In this position a central line through the valve forms an angle B with a horizontal line through the valve center. An angle A indicated in the drawing represents the position of the valve in which it is closed tight. Thus, in the present instance, the valve has been opened or moved out of its closing position by an angle B—A. The valve in accordance with my invention is formed so as to reduce the force of unbalance to a minimum, in fact to be completely balanced in a certain position. In the present example the design of the valve is such that it is completely balanced in the position shown in the drawing in which it has been opened by an angle B—A. This is accomplished by bending and shaping the edge portions of the valve so that the collector and diffusion angles on one side are equal to the corresponding angles on the other side for the balanced position of the valve. As clearly shown in the drawing, the left-hand edge 20 of the valve forms an angle C with the adjacent wall of the conduit which in the balanced position is equal to the angle D formed by the corresponding portion 21 on the right-hand side of the valve with the adjacent conduit wall. The direction of flow of fluid is indicated by an arrow 22 and the angles C and D are termed "collector angles", that is, angles along which collection of fluid takes place during its flow past the spaces defined by the aforementioned edges of the valve with the corresponding conduit walls. As the fluid has passed the edge portions 20 and 21 it enters a space in which it is subject to diffusion and it is important to note that the valve plate is shaped so that the diffusion effect is the same on both sides. The left-hand portion 23 of the valve plate which is plane forms a diffusion angle F with the adjacent conduit wall and the right hand portion 24 of the valve plate is bent so that it forms an angle E with the adjacent conduit wall. In the balanced position indicated in the drawing the angle E equals the angle F. Also, since the walls at 23 and 24 are parallel, the equality of angles F and E makes the angles of the walls opposite 23 and 24 equal so that the valve plate is so shaped on the approach sides that the approach effect is the same on both sides. For the same reason the valve is balanced if the flow is in the other direction.

Summarizing briefly, the edges 20 and 21 of opposite portions of the valve plate are shaped so that both define collectors with the corresponding conduit walls, the collector actions on both sides being equal for a certain position of the valve plate, in the present instance for an angle B—A. The right-hand portion 24 of the valve plate is bent so that it defines a diffuser subjecting the fluid after passing the edge 21 to diffusion, and this diffusion with regard to the right-hand portion of the valve is the same as that caused by the left-hand portion for the angle B—A. The same remarks apply to the approach. Hence, the approach collector and diffusion effects on both sides being equal for such angle, the valve is balanced.

The complete balance is apparent only in one particular position. This position, in the present instance, is 35° from the horizontal. This is indicated in the diagram of Fig. 3 in which angles C, D, E, and F are plotted against the angle B. The diagram shows that for an angle B equaling 35° we have the condition:

Angle C=Angle D, and
Angle E=Angle F

The difference between these angles is also indicated in the diagram by a line 25.

Fig. 5 shows a valve plate 26 for controlling the flow through a rectangular conduit. The plate has inclined edges 27 and 28 corresponding to the edges 20 and 21 of Fig. 2 and the lower half of the plate has a bent portion 29 corresponding to the portion 24 of Fig. 2. The plate is supported by stubs 30 and 31 on opposite portions of the plate defining an axis of support through a central portion of the plate. Here too the two halves of the valve plates are unsymmetrical and shaped so that the plate is balanced in a position near the closing position of the valve. In each case the valve plate has outer edge portions formed or shaped to produce together with the conduit wall in which the valve is placed symmetrical passages on opposite sides of the axis of support of the valve plate. This can be best seen from the arrangement of Fig. 2 in which in the particular position shown the collector passages, as well as the diffuser passages defined between the edges of the valve plate and the conduit wall, are symmetrical with respect to the axis of support of the valve plate.

Having described the method of operation of my invention, together with the apparatus which I now consider to represent the best embodiment thereof, I desire to have it understood that the apparatus shown is only illustrative and that the invention may be carried out by other means.

What I claim as new and desire to secure by Letters Patent of the United States, is,—

1. A butterfly valve for controlling the flow of fluid through a conduit comprising a plate with an axis of support through a central portion thereof, the plate portions on opposite sides of the axis being unsymmetrically shaped to define substantially equal collector and diffuser angles to eliminate forces of unbalance in a definite position near the closing position of the valve.

2. A butterfly valve for controlling the flow of fluid through a conduit comprising a plate having an axis of support through a central portion thereof, the edges defined by portions of the plate opposite the axis of support defining collector angles with the conduit wall, which angles are substantially equal when the valve is near closing position.

3. A butterfly valve for controlling the flow of fluid through a conduit having a valve plate with an axis of support through a central portion of the plate, the plate portions opposite said axis of support defining diffusion angles with the conduit wall which are substantially equal when the valve is near closing position to reduce the unbalance of such valve in said position and thereby to eliminate its tendency to close due to unbalance.

4. A butterfly valve for controlling the flow of fluid through a conduit comprising a plate with an axis of support through a central portion thereof, an edge portion of one half of the plate being bent to define in a certain position near closing position an angle substantially equal to the angle defined between the surface of the corresponding opposite portion of the plate and the conduit wall.

5. A butterfly valve having a plate with an axis of support through a central portion thereof, the plate portions on opposite sides of the axis being formed to produce when placed in a conduit symmetrical passages on opposite sides of the axis of support of the valve.

6. A conduit and a butterfly valve disposed within the conduit and rotatably supported thereon, the valve having a plate with an outer edge shaped to produce symmetrical collector and diffuser passages when partly open.

SANFORD A. MOSS.